(12) United States Patent
Kalish (10) Patent No.: US 11,765,428 B2
(45) Date of Patent: Sep. 19, 2023

(54) SYSTEM AND METHOD TO ADAPTING VIDEO SIZE

(71) Applicant: Idomoo LTD, Raanana (IL)

(72) Inventor: Danny Kalish, Raanana (IL)

(73) Assignee: IDOMOO LTD, Raanana (IL)

( * ) Notice: Subject to any disclaimer, the term of this patent is extended or adjusted under 35 U.S.C. 154(b) by 0 days.

(21) Appl. No.: 17/714,544

(22) Filed: Apr. 6, 2022

(65) Prior Publication Data
US 2022/0329905 A1 Oct. 13, 2022

Related U.S. Application Data

(60) Provisional application No. 63/171,674, filed on Apr. 7, 2021.

(51) Int. Cl.
*H04N 21/4402* (2011.01)
*H04N 21/485* (2011.01)

(52) U.S. Cl.
CPC ........... *H04N 21/440272* (2013.01); *H04N 21/44029* (2013.01); *H04N 21/4858* (2013.01)

(58) Field of Classification Search
CPC ... H04N 21/234318; H04N 21/234363; H04N 21/25825; H04N 21/41407; H04N 21/440263; H04N 21/440272; H04N 21/44029; H04N 21/4858; H04N 21/6587
See application file for complete search history.

(56) References Cited

U.S. PATENT DOCUMENTS

| | | | |
|---|---|---|---|
| 7,958,532 B2* | 6/2011 | Paul | H04N 21/234327 725/135 |
| 8,185,927 B2* | 5/2012 | Karaoguz | H04N 21/47202 725/62 |
| 10,750,243 B2* | 8/2020 | Yamagishi | H04N 21/23439 |
| 10,839,574 B1* | 11/2020 | Smallwood | G06V 40/16 |
| 11,252,478 B2* | 2/2022 | Yamagishi | H04N 21/21805 |
| 11,490,036 B1* | 11/2022 | Uavechanichkul | H04N 21/41407 |
| 2003/0005454 A1* | 1/2003 | Rodriguez | H04N 21/2385 348/E7.071 |
| 2004/0117725 A1* | 6/2004 | Chen | G06F 40/289 715/254 |
| 2007/0033533 A1* | 2/2007 | Sull | G11B 27/034 715/752 |
| 2007/0061862 A1* | 3/2007 | Berger | H04N 7/163 725/62 |
| 2007/0157260 A1* | 7/2007 | Walker | H04N 21/47214 725/86 |
| 2009/0027552 A1* | 1/2009 | Yang | H04N 7/0122 348/465 |

(Continued)

FOREIGN PATENT DOCUMENTS

WO 2018106213 A1 6/2018

*Primary Examiner* — Michael B. Pierorazio
(74) *Attorney, Agent, or Firm* — BROWDY AND NEIMARK, P.L.L.C.

(57) ABSTRACT

The present invention discloses a method for real time dynamic responsive/adapting/adjusting video in real-time to required/defined display size.
The method comrading the steps of:
    Identifying size requirements
    Receiving/uploading instructions/policy for changing/adapting the video based on required display size;
Changing/cropping video based on pre-defined rules or dynamic rules when changing display size requirement.

20 Claims, 11 Drawing Sheets

(56) References Cited

U.S. PATENT DOCUMENTS

| | | | |
|---|---|---|---|
| 2009/0207167 A1* | 8/2009 | Pasetto | H04N 13/194 |
| | | | 348/42 |
| 2010/0303442 A1* | 12/2010 | Newton | H04N 13/139 |
| | | | 386/E5.028 |
| 2011/0242284 A1* | 10/2011 | Takigawa | H04N 13/189 |
| | | | 348/46 |
| 2013/0174202 A1* | 7/2013 | Kim | H04N 21/6547 |
| | | | 725/61 |
| 2014/0282762 A1* | 9/2014 | Bjordammen | H04N 21/47202 |
| | | | 725/92 |
| 2015/0293673 A1* | 10/2015 | Peters | G06F 3/0481 |
| | | | 715/763 |
| 2017/0094327 A1* | 3/2017 | Harrell | H04N 21/2668 |
| 2018/0316942 A1* | 11/2018 | Todd | H04N 21/6587 |
| 2019/0141369 A1* | 5/2019 | Harrell | H04N 21/237 |
| 2019/0182550 A1* | 6/2019 | Yamagishi | H04N 21/26258 |
| 2019/0235644 A1* | 8/2019 | Chen | G06F 1/1686 |
| 2020/0014740 A1* | 1/2020 | Chao | H04L 65/75 |
| 2020/0351559 A1* | 11/2020 | Yamagishi | H04N 21/23439 |
| 2021/0123770 A1* | 4/2021 | Martin | G08G 5/025 |
| 2021/0289259 A1* | 9/2021 | Yang | H04N 21/458 |

* cited by examiner

Figure 2 video generation/adaption tool
100

---

Generating /determining instruction for changing adapting the video at the server
110

Defining template adaptive to video size based on general rules/policy priority or customized or configuring template rules
For each size reduction can be defined different rules which may include one or more actions preformed according to predefined priority such as : changing layout of objects, cropping objects, changing object size deleting object according to predefined priority of objects based on object priorities such as size , Changing text layout, change font apparency of the video or changing text content, Changing size and or property of objects , defining relations between objects size and background , Identifying ROI in picture object and cropping the ROI part before resizing , , Changing GUI interface buttons of the video,
Optionally the objects are ranked by priorities, this rank can determine which objects are first deleted or what the order of presenting the objects or of resizing of objects.
120

Defining code adaptive to video size based on general rules
130

Optionally Generating /determining instruction for changing adapting the video at the player including at least compression or cropping
140

SYSTEM AND METHOD TO ADAPTING VIDEO SIZE

BACKGROUND

Technical Field

The present invention relates generally to generation of adapting video to different sizes.

SUMMARY

The present invention provides a method for real time dynamic responsive/adapting/adjusting video in real-time to required/defined display size, said method comprising the steps:
Identifying size requirements
Receiving/uploading instruction/policy for changing/adapting the video based on required display size;
Changing/cropping video based on pre-defined rules or dynamic rules when changing display size requirement:
According to some embodiments of the present invention the changing video include changing layout of the objects;
According to some embodiments of the present invention the pre-defined rules are based on identify scene in the video;
According to some embodiments of the present invention the changing video include changing GUI interface.
According to some embodiments of the present invention the changing video include extracting/adding objects or changing object size;
According to some embodiments of the present invention the changing video include Changing text layout/font apparency of the video or changing text content.
According to some embodiments of the present invention the pre-defined rules are different for each scene in the video:

The present invention disclose a method for real time dynamic responsive/adapting/adjusting video in real-time to required/defined display size of a mobile device, said method implemented by one or more processors operatively coupled to a non-transitory computer readable storage device, on which are stored modules of instruction code that when executed cause the one or more processors to perform.
Identifying size requirements of video;
Receiving/uploading instruction/policy for changing/adapting the video based on required display size of the mobile device;
Changing and/or cropping video based on pre-defined rules or dynamic rules based on display size requirement;
According to some embodiments of the present invention the changing video includes changing layout of the objects;
According to some embodiments of the present invention the pre-defined rules are based on identify scene in the video:
According to some embodiments of the present invention the changing video include changing GUI interface
According to some embodiments of the present invention the changing video include extracting/adding objects or changing object size:
According to some embodiments of the present invention the changing video include Changing text layout/font apparency of the video or changing text content.
According to some embodiments of the present invention the changing video include Changing text content: or summarizing text or replacing words with shortcut.
According to some embodiments of the present invention an AI algorithm determine tradeoff between number of words and font size.
According to some embodiments of the present invention an NLP algorithm Maps long text sequences to shorter text sequences paraphrasing or change sentence structure, Substituting shorter phrases or Substitute emoji
According to some embodiments of the present invention the method further comprising the step of real time continuous generation of video parts/objects (based on HLS streaming protocol) to be adapted to size limitation based on instruction/template/code responsive to content of video.
According to some embodiments of the present invention identifying size requirements including width and Height is based on data received from the device restriction/capabilities API or user interface current application displaying the video which indicates of the available space for the video.
According to some embodiments of the present invention pre-defined rules are different for each scene in the video:
According to some embodiments of the present invention the method further comprising the step of Identifying at least one ROI (region of interest) in picture object and cropping the ROI part before resizing.

The present invention discloses a system for real time dynamic responsive/adapting/adjusting video in real-time to required/defined display size of a mobile device, said system implemented by one or more processors operatively coupled to a non-transitory computer readable storage device, on which comprised the modules
Display module for Identifying size requirements of video and receiving/uploading instruction/policy for changing/adapting the video based on required display size of the mobile device; and
Video adaption/generation modules for Changing and/or cropping video based on pre-defined rules or dynamic rules based on display size requirement;
According to some embodiments of the present invention the changing video includes changing layout of the objects;
According to some embodiments of the present invention pre-defined rules are based on identify scene in the video;
According to some embodiments of the present invention the changing video include changing GUI interface
According to some embodiments of the present invention the changing video include extracting/adding objects or changing object size
According to some embodiments of the present invention the changing video include Changing text layout/font apparency of the video or changing text content.
According to some embodiments of the present invention the changing video include Changing text content: or summarizing text or replacing words with shortcut.
According to some embodiments of the present invention an AI algorithm determine tradeoff between number of words and font size.
According to some embodiments of the present invention an NLP algorithm Maps long text sequences to shorter text sequences paraphrasing or change sentence structure, Substituting shorter phrases or Substitute emoji

BRIEF DESCRIPTION OF THE SCHEMATICS

The present invention will be more readily understood from the detailed description of embodiments thereof made in conjunction with the accompanying drawings of which.

DETAILED DESCRIPTION OF THE VARIOUS MODULES

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a table of definitions of the terms used throughout this application, adjoined by their properties and examples.

Figure 1A:
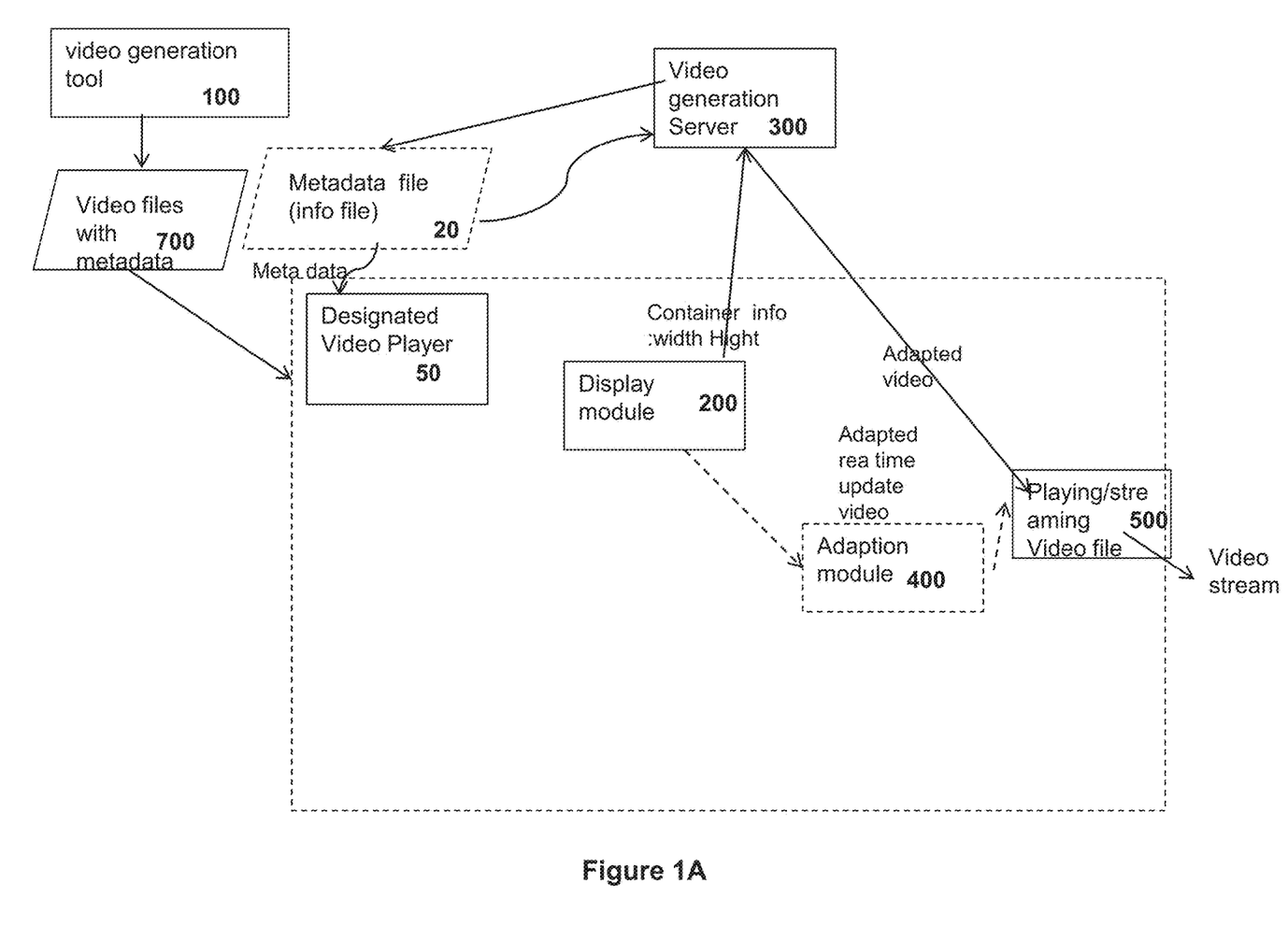
FIG. 1A is a block diagram, depicting the components and the environment of the video adapting system using server for the adaption process, according to some embodiments of the invention.

FIG. 1A is a block diagram, depicting the components and the environment of the video adapting system using server for the adaption process, according to some embodiments of the invention.

The video adapting system include a video generation tool 100 enabling to generate template or code of video which includes rules for adapting video generation based on given video size, providing the most suitable video for the given size. The designated video player 50 receive the required video to play and/or the video metadata such as the ID of video, at a video display module 200 are identified the size requirements based the running application or restriction/capabilities API data of the phone. The identified size requirements are sent to a video generation server 300, which receive the video data and meta data from the player or the cloud and generates the adapted video. The adapted video is sent or streamed back to the designated video player 500, at the player the adapted video is decoded and displayed/streamed to the user. Option the player includes adaption module configured to preform part of the adaption process in the player.

Figure 1B:
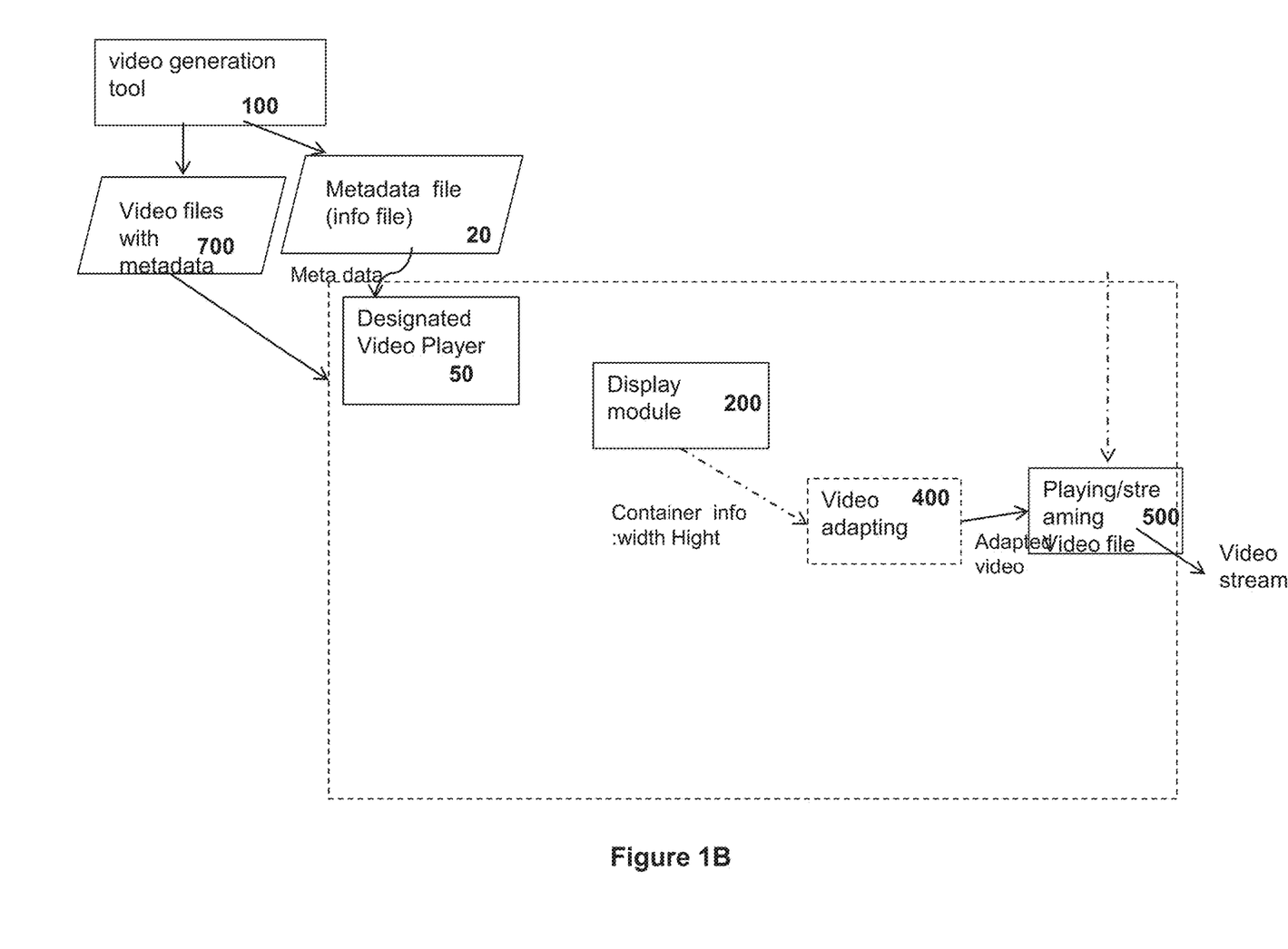
FIG. 1B is a block diagram, depicting the components and the environment of the video adapting system having inner module for the adaption process, according to some embodiments of the invention.

FIG. 1B is a block diagram, depicting the components and the environment of the video adapting system having inner module for the adaption process, according to some embodiments of the invention.

According to some embodiments of the present invention the video adaption is implemented at the designated player 50, instead at the generation server 300. The video adaption module 400 receives the size requirements from the video display module 200 and meta data, based on the size requirements and the meta data of the video. Based on the received data the module generates/adapt the video to the requirement size.

According to other embodiments of the present invention the video adaption can be party processed at the generation server and partly at the adaption module.

Embodiments of the Invention

Figure 1C:
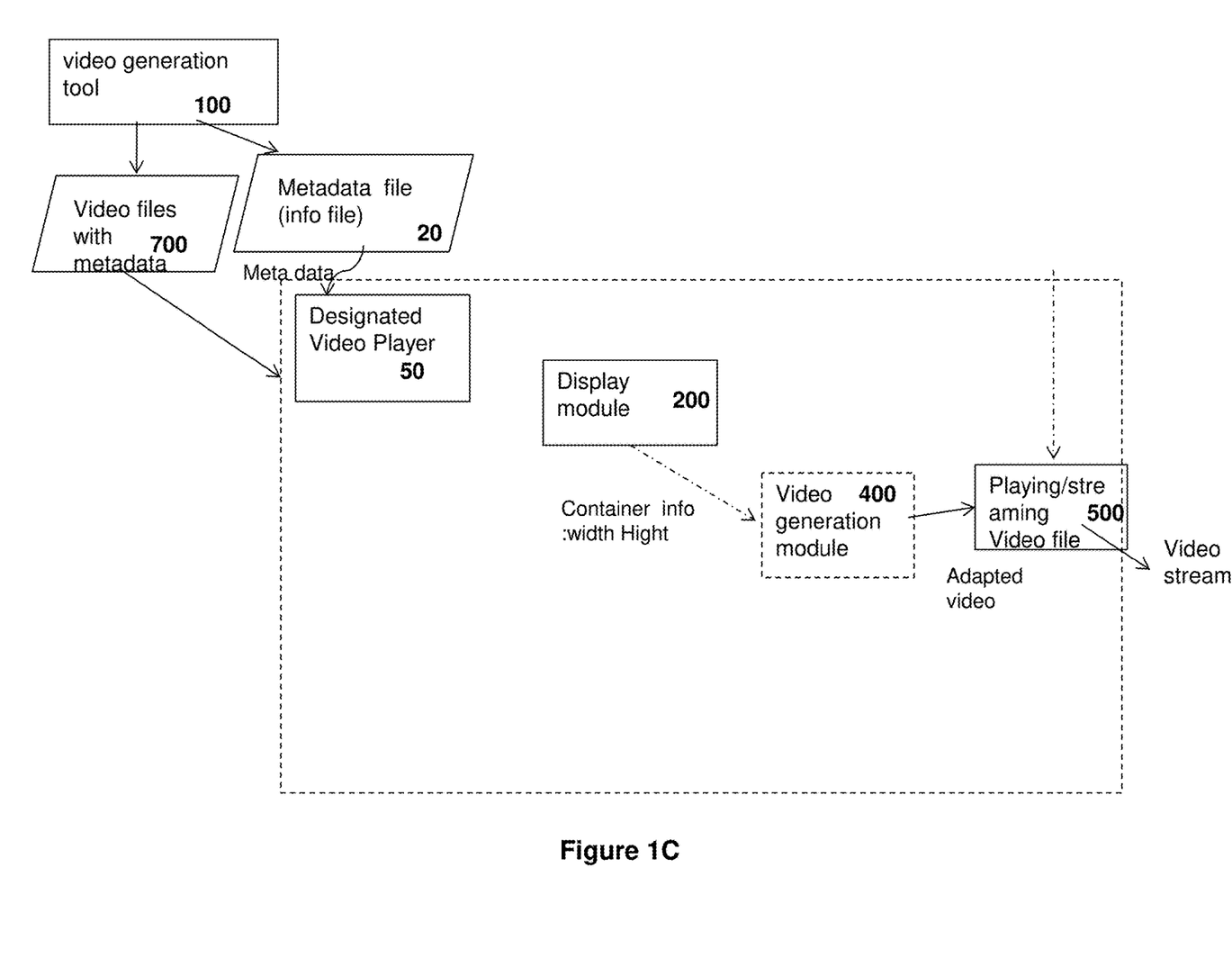
FIG. 1C is a block diagram, depicting the components and the environment of the video adapting and generation system having inner module for the video generation process, according to some embodiments of the invention.

FIG. 1C is a block diagram, depicting the components and the environment of the video adapting and generation, system having inner module for the video generation process, according to some embodiments of the invention.

According to some embodiments of the present invention the video generation module is implemented at the designated player 50, instead at the generation server 300. The video generation module 400 receives the size requirements from the video display module 200 and meta data, based on the size requirements and the meta data of the video. Based on the received data the module generates the video to the requirement size.

According to other embodiments of the present invention the video generation can be party processed at the generation server and partly at the generation module.

Figure 2:
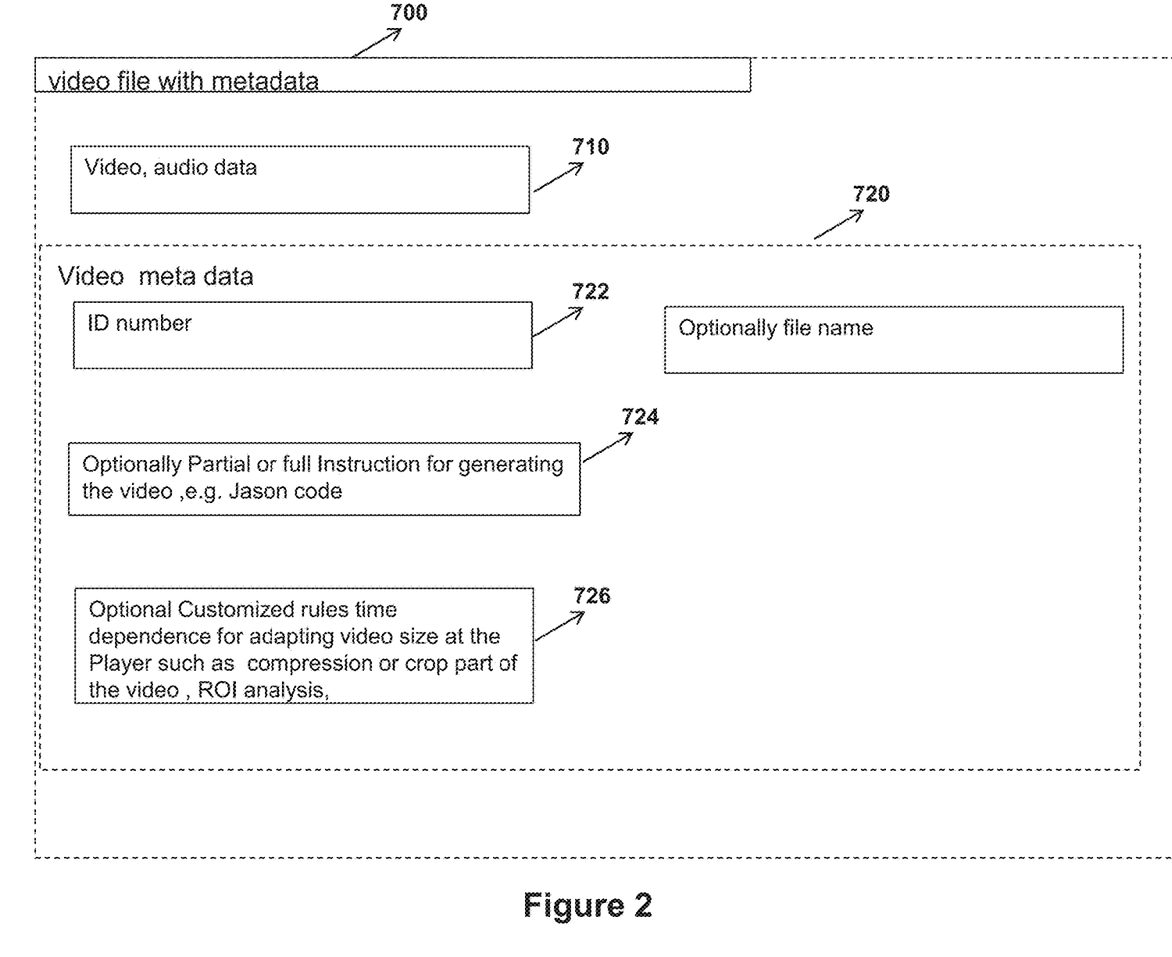
FIG. 2 is a block diagram depicting the video file format information structure, according to one embodiment of the invention.

FIG. 2 is a block diagram depicting the video file format information structure, according to one embodiment of the invention.

The video file format include Video, audio data 710, ID number, 720 or optionally file name and optionally Partial or full Instruction for generating the video (722), e.g. Jason code and Optional Customized rules for adapting video size at the Player (724) such as compression or crop part of the video (726)

Figure 3:
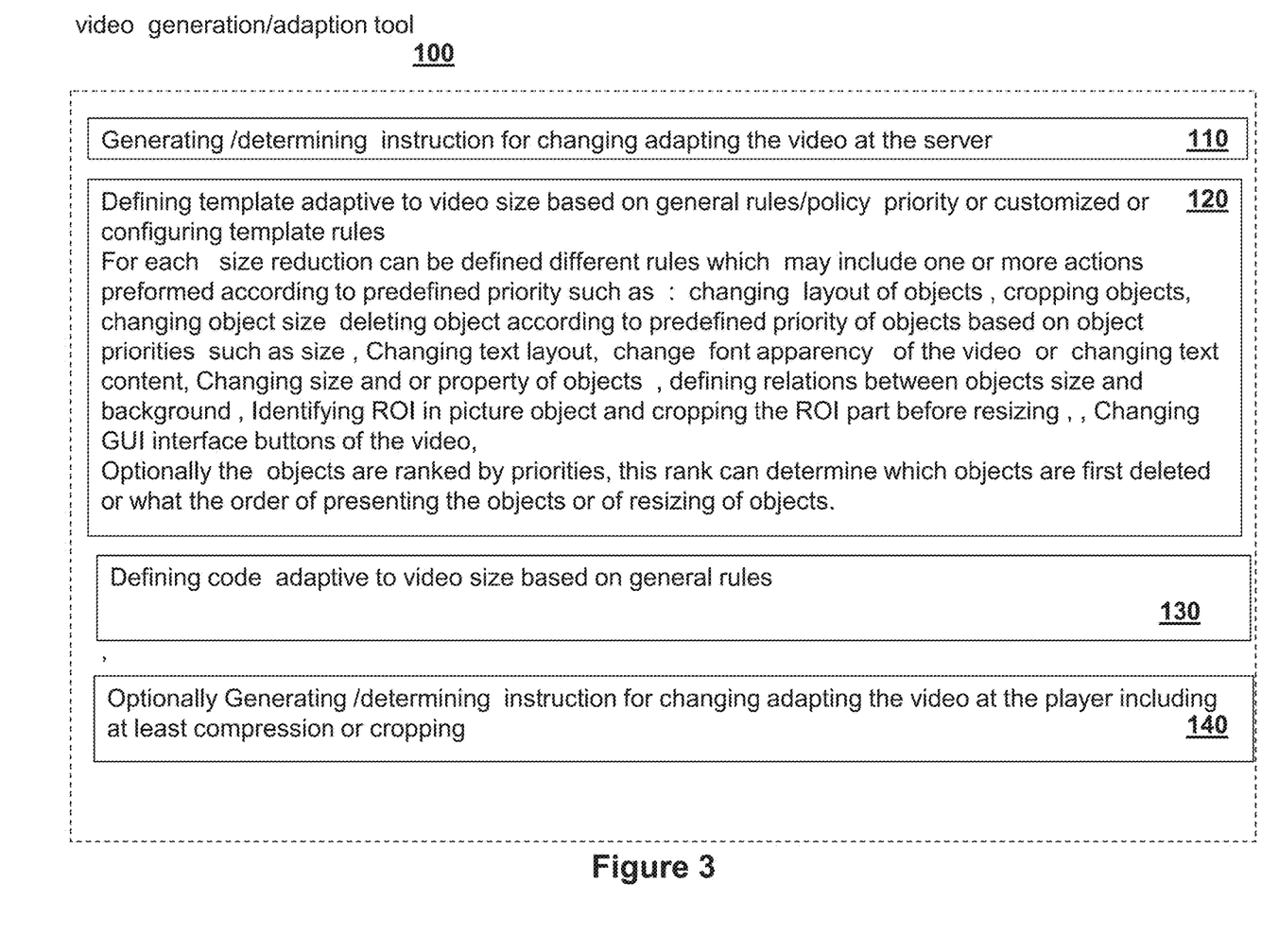
FIG. 3 is a flowchart depicting the video generation tool/adaption 100, according to some embodiments of the invention.

FIG. 3 is a flowchart depicting the video generation tool/adaption 100, according to some embodiments of the invention.

The video generation tool/adaption 100, apply at least one of the following steps:

Generating/determining instruction for changing adapting the video (110);

Defining template adaptive to video size based on general rules/policy priority or customized or configuring template rules;

For each size reduction can be defined different rules which may include one or more actions preformed according to predefined priority such as: changing layout of objects optionally based on given objects priorities, cropping objects, changing object size deleting object, Changing text layout, change font apparency of the video or changing text content, Changing size and or property of objects, defining relations between objects size and background, Identifying ROI in picture object and cropping the ROI part before resizing, Changing GUI interface buttons of the video, (120). Optionally the objects are ranked by priorities, this rank can determine which objects are first deleted or what the order of presenting the objects or of resizing of objects.

The rules are prioritized based on preference for example, at first only layout of objects is changed at a second stage the object size is changed and only on at third stage cropping objects or deleting objects. (130).

Figure 4:
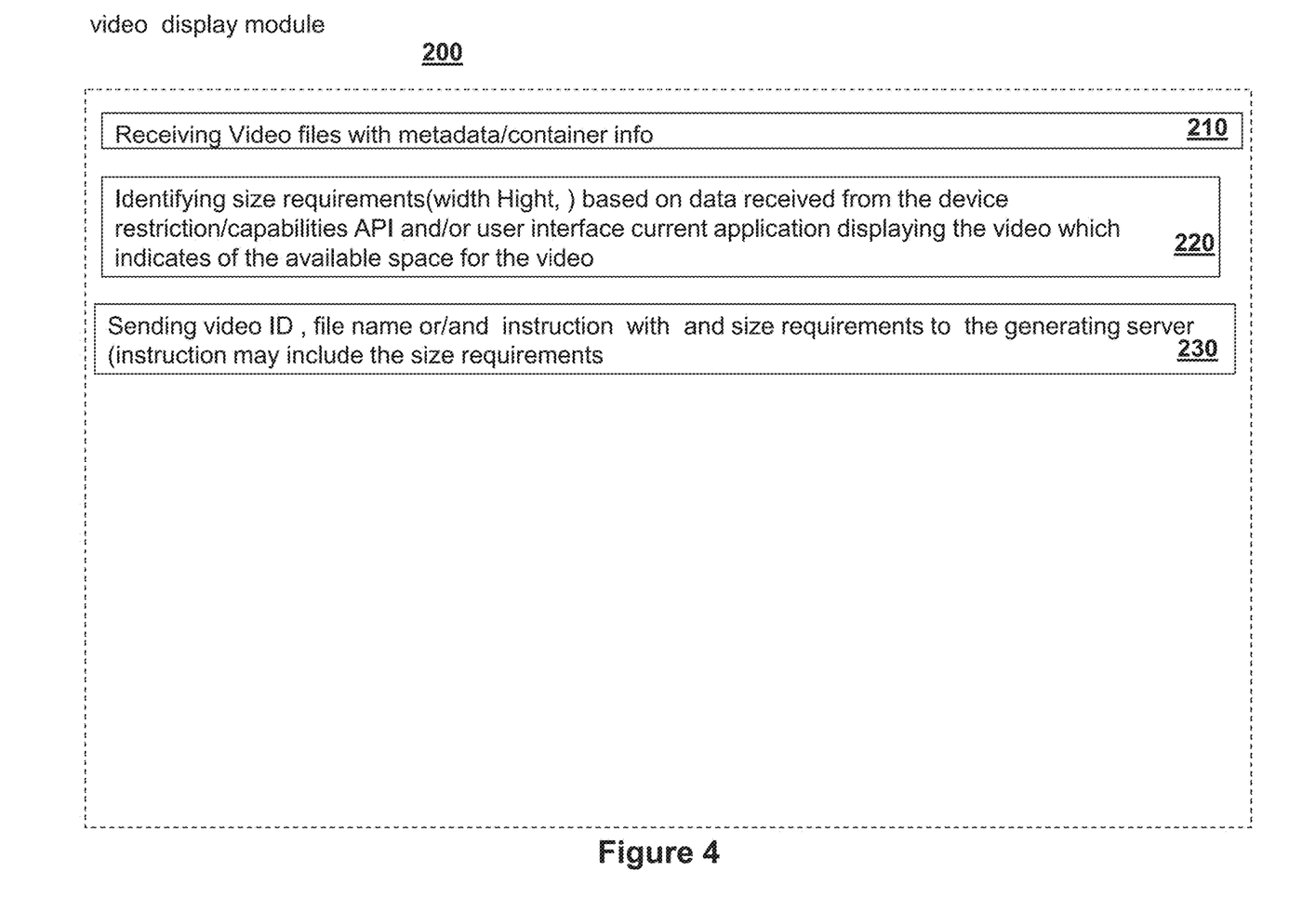
FIG. 4 is a flowchart depicting video display module according to some embodiments of the invention.
Figure 4A:
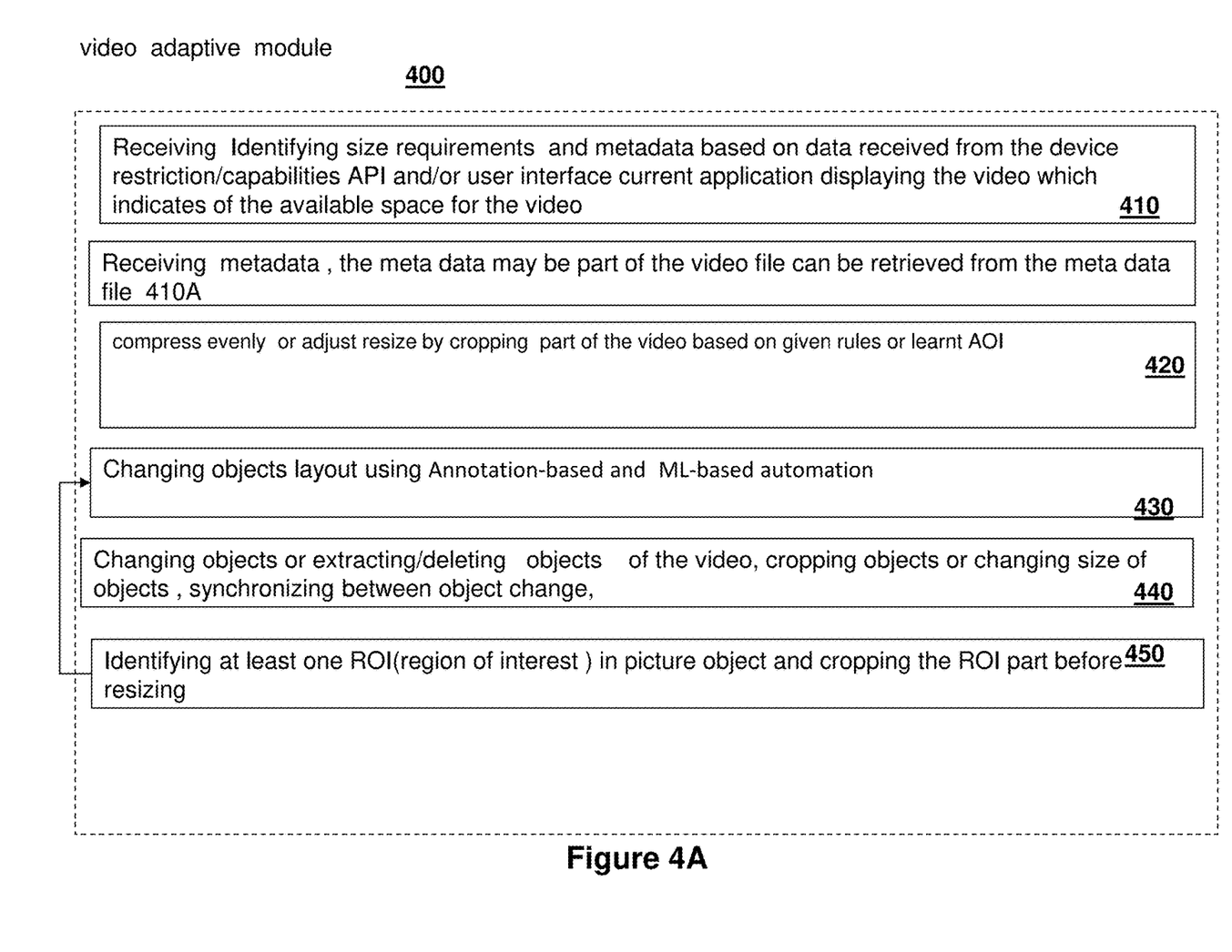
FIG. 4A is a flowchart depicting a video adaptive module according to some embodiments of the invention.

Optionally Generating/determining instruction for changing adapting the video at the player including at least compression or cropping (140);

The rules or instruction may relate to changing text layout/font apparency of the video or changing text content, changing objects size property or extracting objects of the video or changing text content, cropping objects or changing size of objects, defining relation between objects size and background Some rules may relate to identifying ROI in picture object and cropping the ROI part before resizing:

According to some embodiments of the present invention instead of using video template it is suggested to define code which adapt the video size based on general rules/policy or customized the rules relating to layout, cropping, Changing GUI interface buttons of the video, FIG. 4 is a flowchart depicting video display module according to some embodiments of the invention.

Figure 5A:
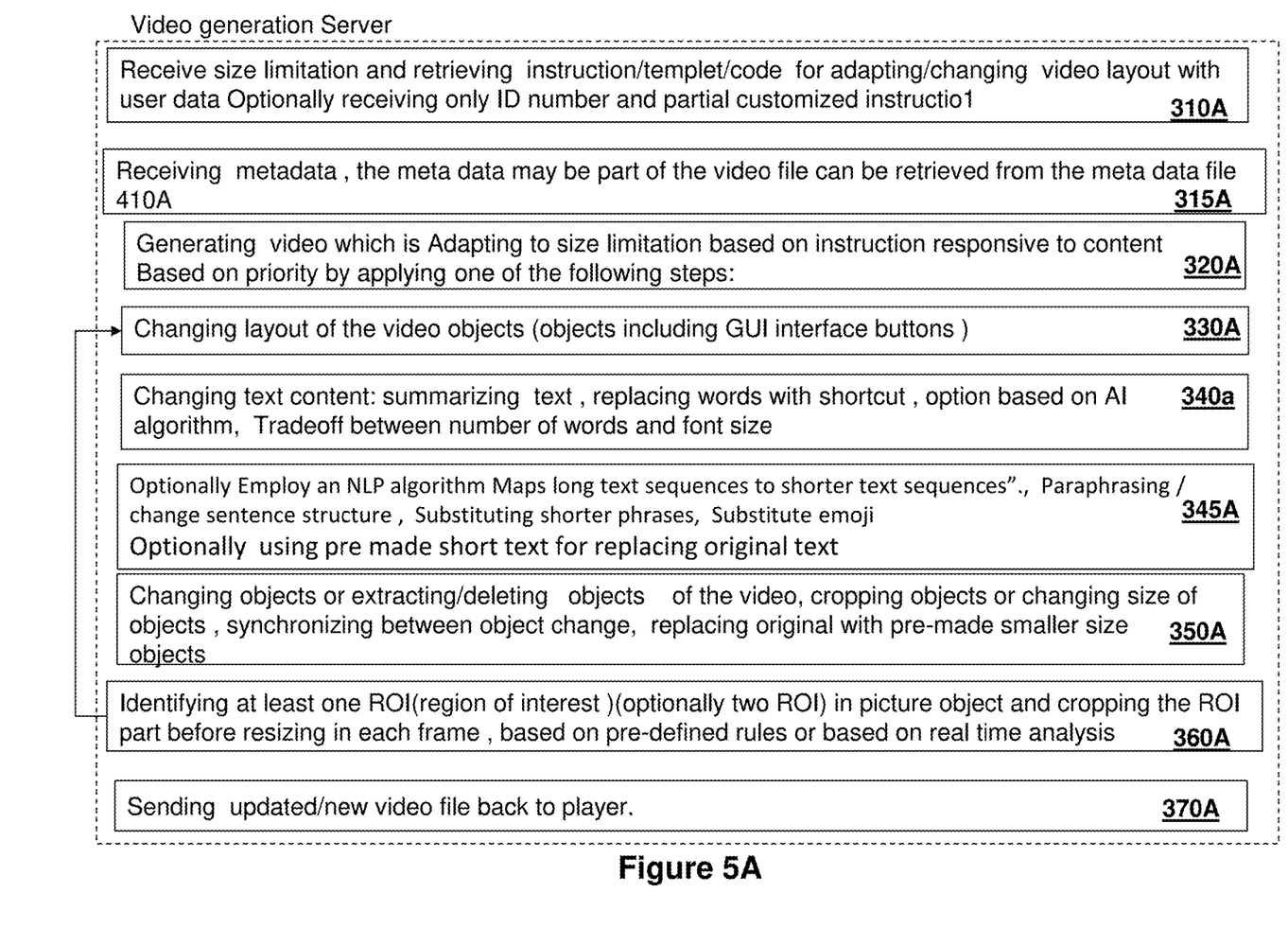
FIG. 5A presents a flowchart, Video generation Server, according to some embodiments of the invention.

The video display module 200, apply at least one of the following steps:

Receiving Video files with metadata (210);

Identifying size requirements based on data received from the device restriction/capabilities API and/or user interface current application displaying the video which indicates of the available space for the video (220);

Sending video ID or video file with meta data and size requirements to the generating server (230);

FIG. 5A presents a flowchart, Video generation Server, according to some embodiments of the invention.

Figure 5B:
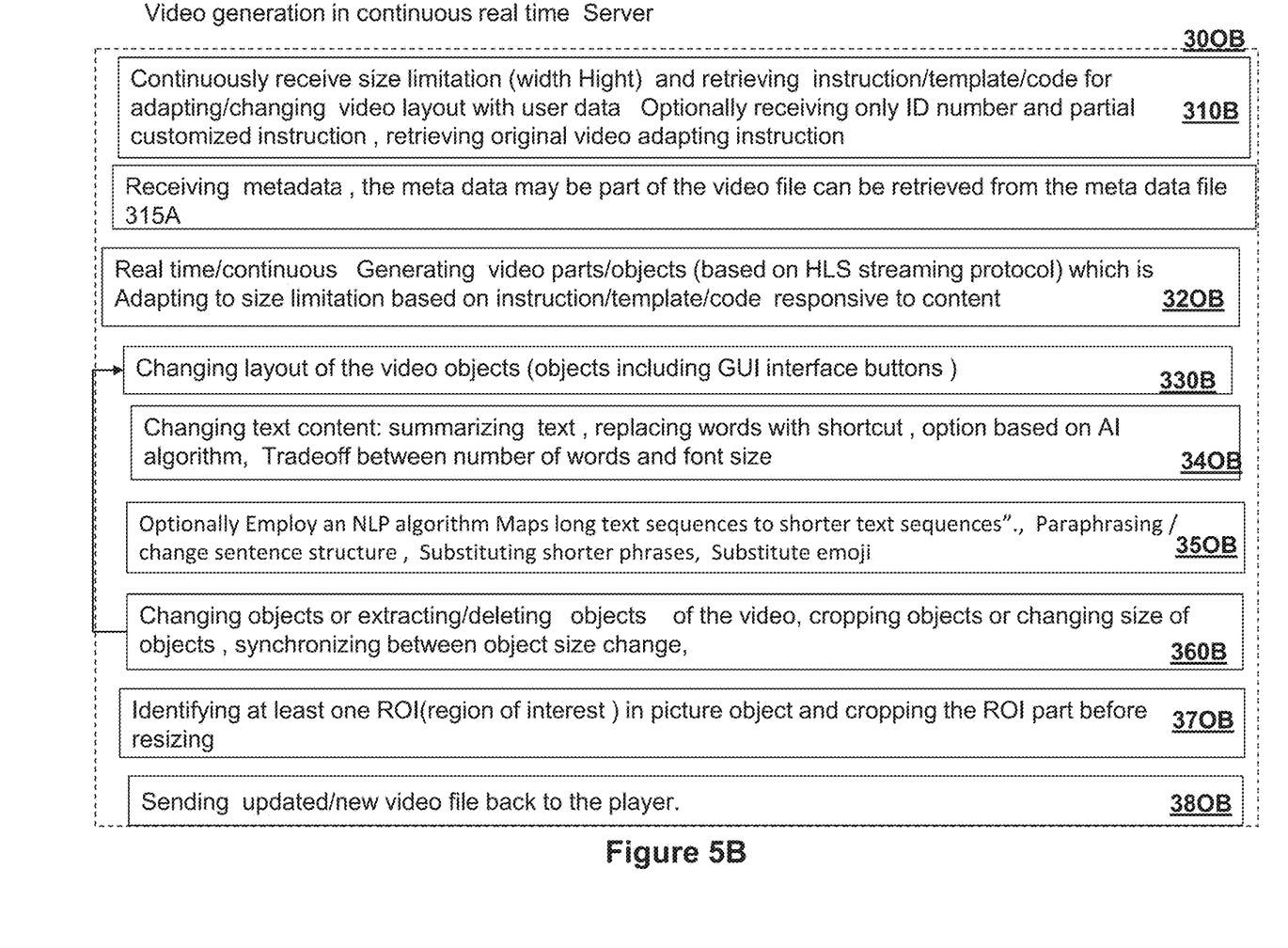
FIG. 5B presents a flowchart, Video generation in real time server, according to some embodiments of the invention.

The video generation server performs at least one of the fling steps;

Receive size limitation and retrieving, instruction/templet/code for adapting/changing video layout with user data (310A);

Optionally receiving only ID number and partial customized instruction, retrieving original video adapting instruction/template (315A);

Generating video which is adapting to size limitation based on instruction/rules responsive to content based on template of code according to the following steps according to the priority defined by the rules (320A);

Changing text layout/font apparency of the video or changing text content (objects including GUI interface buttons) (330a):

Changing text content: summarizing text, replacing words with shortcut, option based on AI algorithm, Tradeoff between number of words and font size Optionally Employ an NLP algorithm Maps long text sequences to shorter text sequences". Paraphrasing/change sentence structure, substituting shorter phrases, Substitute emoji, optionally using pre made short text for replacing original text (345A);

Changing, updating objects properties extracting/deleting objects of the video or changing text content, cropping objects or changing size of objects, optionally the object changes are synchronized, replacing original with pre-made smaller size objects (350A);

Identifying ROI in picture object and cropping the ROI part before resizing (360A):

Sending updated/new video file back to player (370A);

FIG. 5B presents a flowchart, Video generation in real time Server, according to some embodiments of the invention.

The video generation server performs at least one of the fling steps;

Continuously receive size limitation (width Height) and retrieving instruction/template/code for adapting/changing video layout with user data Optionally receiving only ID number and partial customized instruction, retrieving original video adapting instruction (310B):

Real time Generating video which is Adapting to size limitation based on instruction/rules responsive to content according to the following steps according to the priority defined by the rules; applying at least one of the following steps (320B).

Changing objects layout/font apparency of the video or changing text content, summarizing text, replacing words with shortcut (330B)

Changing cropping image objects or changing size of objects, synchronizing between object change (340B)

Identifying at least one ROI in picture object and cropping the ROI part before resizing, altering object compressing part of the image, ROI priority (350B);

extracting/deleting objects of the video (360B):

Changing GUI interface buttons of the video (370B):

At the end of video generation sending updated/new stream back to player (390B).

Figure 6A:
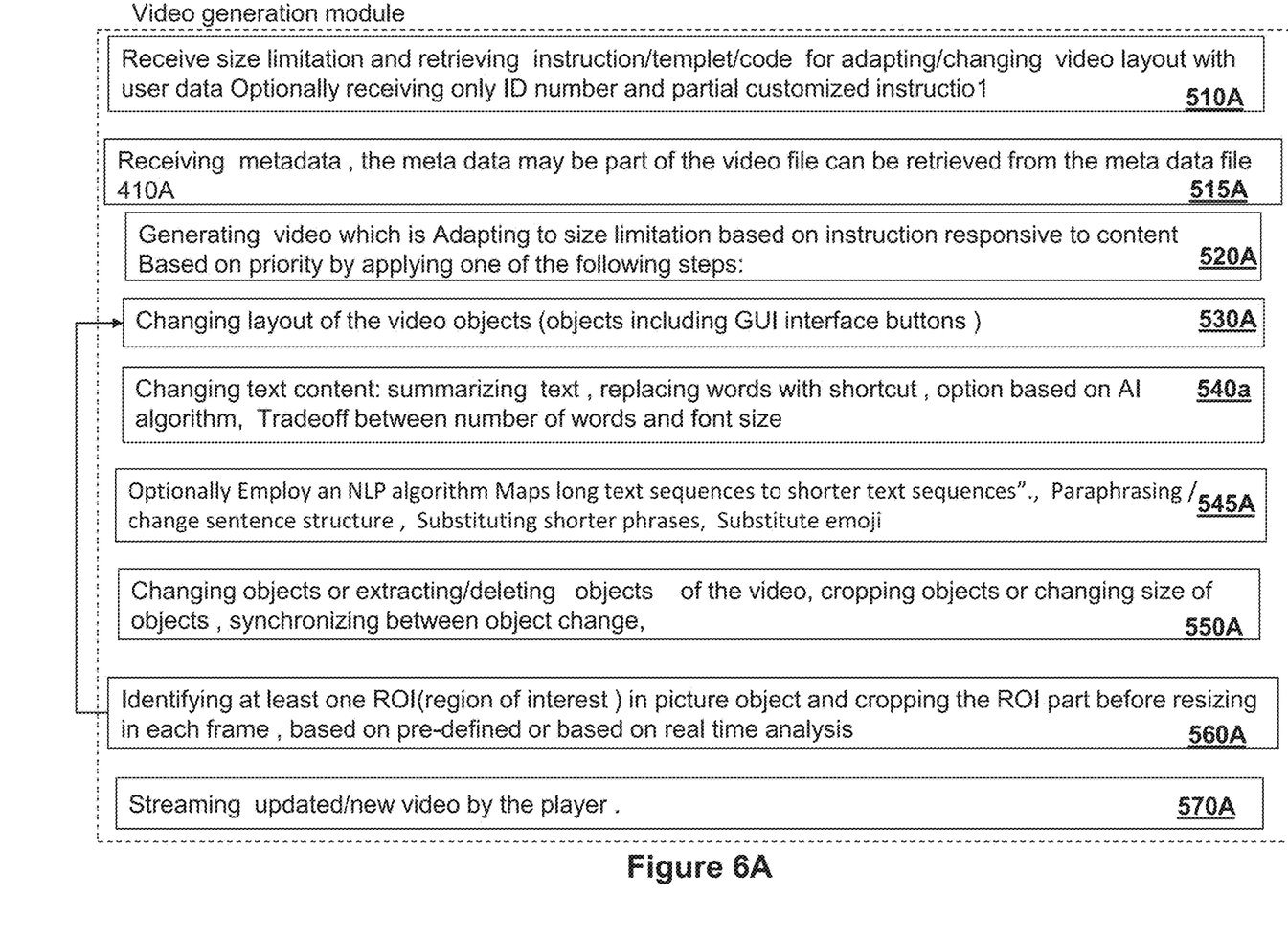
FIG. 6A presents a flowchart, Video generation module, according to some embodiments of the invention.

FIG. 6A presents a flowchart, Video generation module, according to some embodiments of the invention.

The video generation module performs at least one of the fling steps;

Receive size limitation and retrieving, instruction/templet/code for adapting/changing video layout with user data (510A);

Optionally receiving only ID number and partial customized instruction, retrieving original video adapting instruction/template (515A):

Generating video which is adapting to size limitation based on instruction/rules responsive to content based on template of code according to the following steps according to the priority defined by the rules (520A):

Changing text layout/font apparency of the video or changing text content (objects including GUI interface buttons) (530a);

Changing text content: summarizing text, replacing words with shortcut, option based on AI algorithm, Tradeoff between number of words and font size; (540A)

Figure 6B:
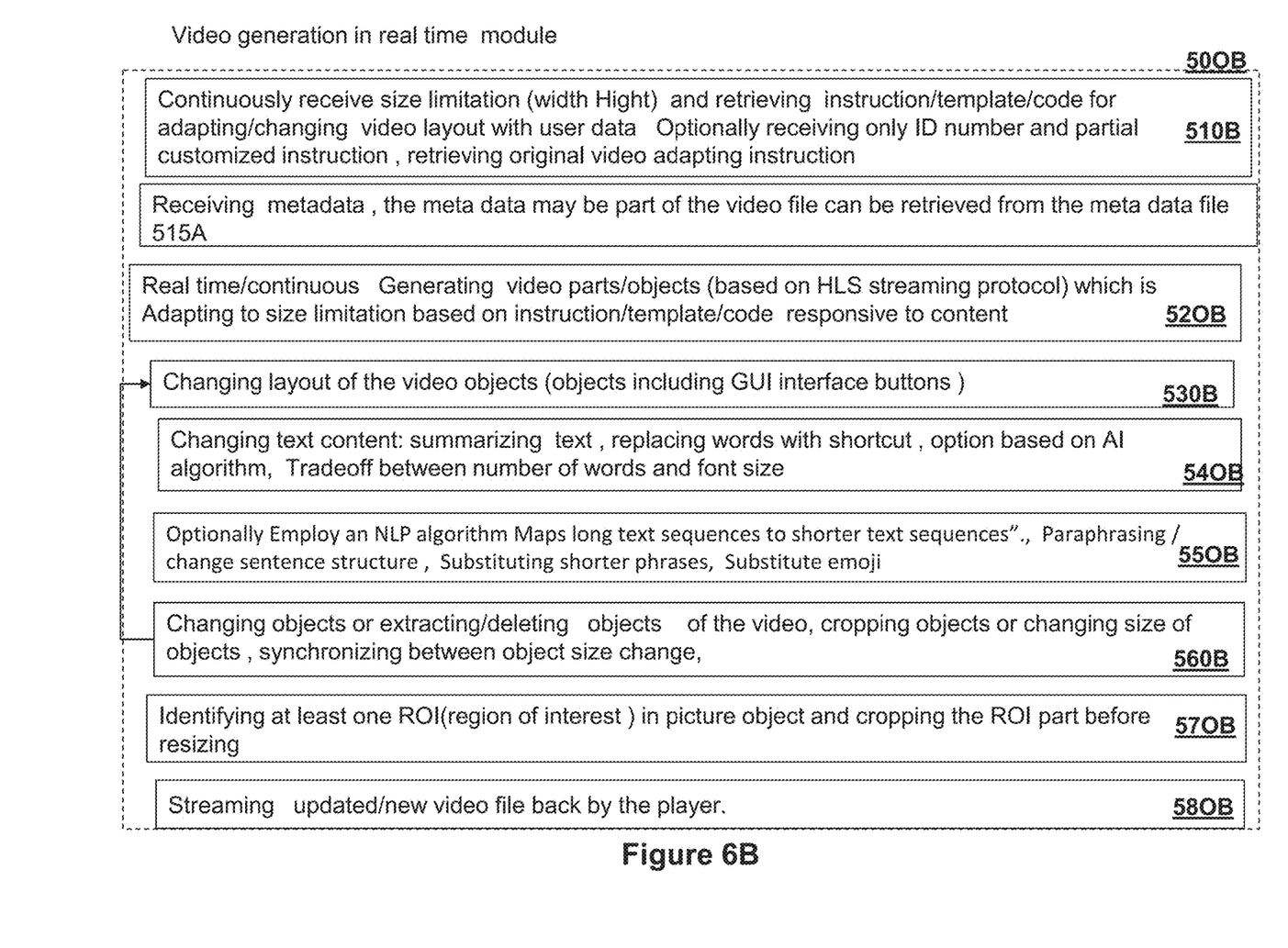
FIG. 6B presents a flowchart, Video generation in real time module, according to some embodiments of the invention.

Optionally Employ an NLP algorithm Maps long text sequences to shorter text sequences". Paraphrasing/change sentence structure, Substituting shorter phrases, Substitute emoji (545A);

Changing, updating objects properties extracting/deleting objects of the video or changing text content, cropping objects or changing size of objects, optionally the object changes are synchronized (550A);

Identifying ROI in picture object and cropping the ROI part before resizing (360A);

Streaming updated/new video file back by the player (570A):

FIG. 6B presents a flowchart, Video generation in real time module, according to some embodiments of the invention.

The video generation module performs at least one of the fling steps;

Continuously receive size limitation (width Height) and retrieving instruction/template/code for adapting/changing video layout with user data Optionally receiving only ID number and partial customized instruction, retrieving original video adapting instruction (510B):

Real time Generating video which is Adapting to size limitation based on instruction/rules responsive to content according to the following steps according to the priority defined by the rules; applying at least one of the following steps (520B).

Changing objects layout/font apparency of the video or changing text content, summarizing text, replacing words with shortcut (530B)

Changing cropping image objects or changing size of objects, synchronizing between object change (540B)

Identifying at least one ROI in picture object and cropping the ROI part before resizing, altering object compressing part of the image, ROI priority (550B);

extracting/deleting objects of the video (560B);

Changing GUI interface buttons of the video (570B):

At the end of video generation, streaming updated/new by the player (590B).

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitably operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to 1s any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such, and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

What is claimed is:

1. A method for real time dynamic responsive adapting or adjusting of video in real time to required or defined display size of a mobile device, said method implemented by one or more processors operatively coupled to a non-transitory computer readable storage device, on which are stored modules of instruction code that when executed cause the one or more processors to perform:
   identifying size requirements of video;
   receiving instruction or policy for changing or adapting the video based on required display size of the mobile device;
   in real time, continuously generating the video including changing the video based on pre-defined rules or dynamic rules based on the required display size of the mobile device;
   wherein the changing of the video is based on a template responsive to content of the video that includes changing layout of video objects;
   wherein the template includes rules for adapting video generation based on given video size.

2. The method of claim 1 wherein pre-defined rules is based on identify scene in the video.

3. The method of claim 1 wherein the changing of the video includes changing GUI interface.

4. The method of claim 1 wherein the changing of the video includes extracting or adding objects or changing object size.

5. The method of claim 1 wherein the changing of the video includes changing text layout or font opacity of the video or changing text content.

6. The method of claim 1 wherein the changing of the video includes changing text content or summarizing text or replacing words with shortcut.

7. The method of claim 1 wherein an AI algorithm determine tradeoff between number of words and font size.

8. The method of claim 1 wherein an NLP algorithm maps long text sequences to shorter text sequences paraphrasing or change sentence structure, substituting shorter phrases or substitute emoji.

9. The method of claim 1 further comprising the step of real time continuous generation of video parts or objects (based on HLS streaming protocol) to be adapted to size limitation based on instruction or template or code responsive to content of video.

10. The method of claim 1 wherein identifying size requirements including width and height is based on data received from the device restriction or capabilities API or user interface current application displaying the video which indicates of the available space for the video.

11. The method of claim 1 wherein pre-defined rules is different for each scene in the video.

12. The method of claim 1 further comprising the step of identifying at least one ROI (region of interest) in picture object and cropping the ROI part before resizing.

13. A system for real time dynamic responsive adapting or adjusting of video in real time to required or defined display size of a mobile device, said system implemented by one or more processors operatively coupled to a non-transitory computer readable storage device, on which are comprised the modules:
   display module for identifying size requirements of video and receiving or uploading instruction or policy for changing or adapting the video based on required display size of the mobile device; and
   video adaption modules for, in real time, continuously generating the video including changing the video based on pre-defined rules or dynamic rules based on the required display size of the mobile device;
   wherein the changing of the video is based on a template responsive to content of the video that includes changing layout of video objects;
   wherein the template includes rules for adapting video generation based on given video size.

14. The system of claim 13 wherein pre-defined rules is based on identify scene in the video.

15. The system of claim 13 wherein the changing of the video includes changing GUI interface.

16. The system of claim 13 wherein the changing of the video includes extracting or adding objects or changing object size.

17. The system of claim 13 wherein the changing of the video include changing text layout or font opacity of the video or changing text content.

18. The system of claim 13 wherein the adaption module comprising the step of real time continuous generation of video parts or objects (based on HLS streaming protocol) to be adapted to size limitation based on instruction or template or code responsive to content of video.

19. The system of claim 13 wherein the adaption module is further configured for identifying at least one ROI (region of interest) in picture object and cropping the ROI part before resizing.

20. A method for real time dynamic responsive adapting or adjusting of video in real time to required or defined display size of a mobile device, said method implemented by one or more processors operatively coupled to a non-transitory computer readable storage device, on which are stored modules of instruction code that when executed cause the one or more processors to perform:
   identifying size requirements of video;
   receiving instruction or policy for changing or adapting the video based on required display size of the mobile device;
   in real time, continuously generating the video including changing the video based on pre-defined rules or dynamic rules based on the required display size of the mobile device;
   wherein the changing of the video is based on a template responsive to content of video that includes changing size of video objects;
   wherein the template includes rules for adapting video generation based on given video size;

wherein changing the size of the video objects includes replacing original objects with smaller-size or larger-size objects.

\* \* \* \* \*